Sept. 15, 1964

A. H. LIPTON 3,149,266

ELECTRICAL CIRCUIT UNITS

Filed Nov. 9, 1960

INVENTOR
ALVIN H. LIPTON
BY Louis A. Kline
Richard G. Stahr
HIS ATTORNEYS

United States Patent Office 3,149,266

Patented Sept. 15, 1964

3,149,266

ELECTRICAL CIRCUIT UNITS

Alvin H. Lipton, Dayton, Ohio, assignor to The National Cash Register Company, Dayton, Ohio, a corporation of Maryland Filed Nov. 9, 1960, Ser. No. 68,204

8 Claims. (Cl. 317—101)

This invention relates to electrical circuit units and, more specifically, to electrical circuit units of the type having an integral circuit component inter-connecting conductive pattern and supporting panel.

With prior art electrical circuit units of this type, commonly referred to as "printed circuits," a panel of dielectric material has served as an integral support for an inter-connecting conductive pattern which is unique for a specific circuit. These circuit units have proved to be highly inflexible, in that a change in the conductive pattern is required with each change in circuitry. Not only has this made revisions in the field virtually impossible, but, depending upon the process employed for originally outlining the conductive pattern upon the dielectric panel, the manufacture of circuits of this type requires the use of stencils, patterns, photographic negatives, or printing plates having the distinctive outline peculiar to the specific circuit pattern. Because of the permanent nature of these auxiliary items, every change in the inter-connecting pattern, however small, demands that a new auxiliary item be prepared, thereby increasing the cost of production. As the use of circuit units of this type is becoming increasingly widespread, the requirement of an electrical circuit unit having virtually unlimited flexibility is apparent.

It is, therefore, an object of this invention to provide an improved electrical circuit unit of the type having an integral circuit component inter-connecting conductive pattern and support panel.

It is another object of this invention to provide an improved electrical circuit unit of the type having an integral circuit component inter-connecting conductive pattern and support panel in which the conductive patern is substantially universal and may be readily adapted to any desired circuit arrangement by altering the locations of applied circuit components.

In accordance with this invention, an electrical circuit unit of the type having an integral circuit component inter-connecting conductive pattern and supporting panel is provided wherein a panel of dielectric material having a plurality of spaced parallel grooves upon one surface surface of each groove and a conductor element secured to each surface between adjacent ones of the grooves whereby successive conductor elements are separated by a distance equal to the depth of the grooves.

Figure 1:
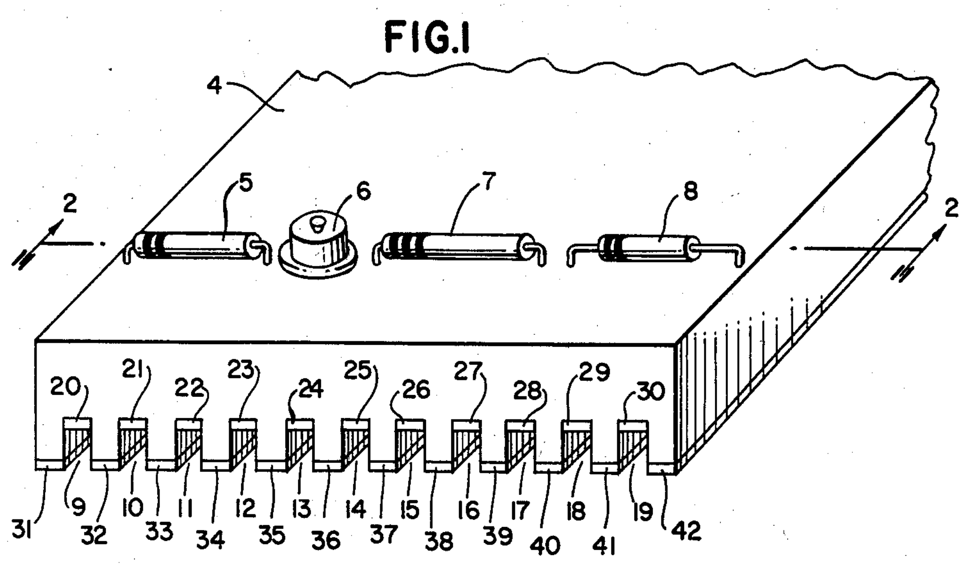
Figure 2:
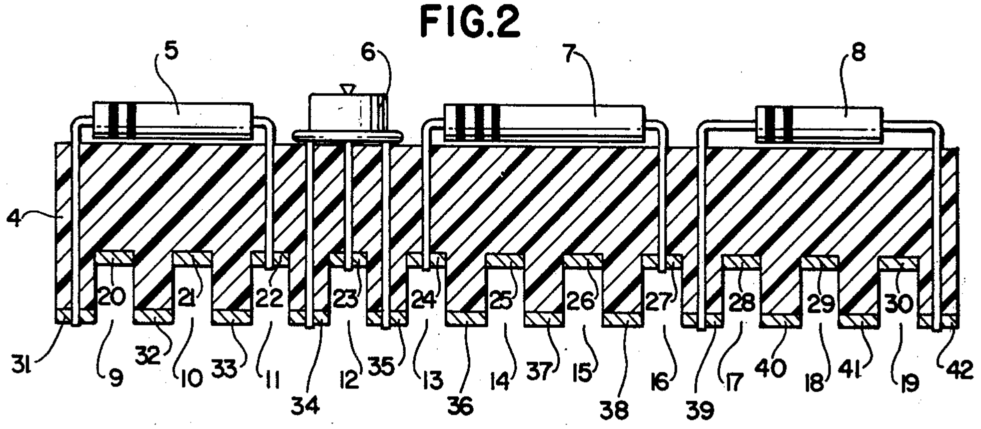

For a better understanding of the present invention, together with further objects, advantages and features thereof, reference is made to the following description and accompanying drawing, in which:

FIGURE 1 is a fragmentary isometiric view of an electrical circuit unit of this invention; and FIGURE 2 is a cross-sectional view of FIGURE 1, taken along line 2—2, and locking in the direction of the arrows.

Referring to the drawing, wherein like characters of reference designate like or corresponding parts throughout the several views, there are shown two separate views of an electrical circuit unit of this invention.

Upon one surface of a support panel 4, which may be of any suitable non-conductive material such as glass, plastic, or paper, for example, is a plurality of spaced parallel grooves 9, 10, 11, 12, 13, 14, 15, 16, 17, 18, and 19, which may be produced by any one of several well-known methods. These grooves are herein indicated as being of a constant width, depth, and inter-spacing; however, this is not necessary with electrical circuit unit of this invention. These grooves may be of varying widths and depths and may be spaced apart by varying distances should circuit requirements so dictate. The only requirement necessary is that the grooves be of a sufficient depth to provide adequate insulation between sucessive conductor elements and to prevent the bridging of solder between successive conductor elements during solder dipping.

Secured to the bottom surface of each one of the grooves 9 through 19, inclusive, is a conductor element 20 through 30, respectively. These conductor elements may be secured to the bottom surface of the corresponding groove through any one of several processes well known in the art.

A similar conductor element is secured to each surface between adjacent ones of the grooves 9 through 19, inclusive. These conductor elements are herein indicated by the reference numerals 31 through 42, inclusive. With this arrangement, successive conductor elements are separated by a distance equal to the depth of the grooves. That is, conductor element 20 is separated from conductor element 31 by the depth of groove 9. Similarly, conductor element 42 is separated from conductor element 30 by the depth of groove 19. Through this expedient, insulation is provided by the panel material between succesive conductor elements.

In FIGURE 2, the conductor element secured to the bottom of each groove is indicated as being substantially the width of the groove, while the conductor elements secured to thesurface between adjacent ones of the grooves are indicated as being of a width substantially equal to the space between the grooves. While this is perhaps the most desirable width for the conductor elements, it is by one means mandatory that the conductor elements be of this width, but they may be of any width less than the width of the grooves or than the width of the space between the grooves. The grooves 9 through 19, inclusive, of FIGURE 2 have been indicated as being all of an equal depth. With this arrangement, two planes of conductor elements, separated by a distance equal to the depth of the grooves, are provided. Again, it is not mandatory that all of the grooves be of an equal depth, the only requirement being that successive strips be insulated for the voltages applied thereto and that the distance between successive elements be sufficiently great to prevent the flow of solder from one conductor element to the next successive element.

A variety of electrical circuit components may be mounted upon the electrical circuit unit of this invention through the simple expedient of providing mechanical perforations through the panel and selected ones of the conductor elements through which the component terminals may extend and be soldered or otherwise electrically connected to the conductor elements. In this instance, the term "terminals" should not be limited to mechanical devices specifically designed and developed for the purpose of facilitating electrical inter-connections, but is to be considered in the broader sense to include those portions of any electrical circuit component to which electrical connections are normally made and may be the wire leads of resistors and capacitors, the wire of the windings of coils, or the terminals of transistors or vacuum tubes. The locations of the perforations, of course, are determined by the desired inter-connections between the various electrical components, as dictated by circuit requirements.

For example, in FIGURE 1 of the drawing there is shown a variety of electrical components, 5, 6, 7, and 8, which may be resistors, capacitors, diodes, transistors, etc. The components illustrated in FIGURE 1 are not arranged in compliance with any specific circuit requirement, but are intended to be illustrative of the manner in which circuit components may be mounted upon the supporting panel 4. This is better illustrated in FIGURE 2, which is a cross-sectional view of FIGURE 1. Component 5 is indicated as being connected to conductor element 31 and conductor element 22 through mechanical perforations in panel 4. Element 6 is indicated as being connected to conductor elements 34, 23, and 35 through mechanical perforations in panel 4. Similarly, elements 7 and 8 indicate that both terminals of any element may be connected to the conductor elements secured to the bottom of the grooves, or both terminals may be secured to the conductor elements secured to the spaces between the grooves, as illustrated. The terminals of these components may be carried to external circuitry through the conductor elements to which they are connected through the use of panel connectors of a type which are well known in the art which may be connected to either end of these conductor elements.

With this circuit unit, it is clear that through connections between the top and bottom surfaces of the supporting panel may be completed through the component terminals or leads and without special treatment of the panel except for mechanical perforations. In this manner, inter-connections may be made between a variety of electrical components, as determined by circuit requirements, through various combinations of the conductive strips. For example, should it be desired to connect elements 5 and 7 in series, it is only necessary that the lead of element 7 which is shown as being connected to conductor element 24 be removed and reconnected to conductor element 22, or the lead or terminal of element 5 which is shown as being connected to element 22 may be removed and re-connected to element 24.

It may be noted that each of the terminals or leads of each of the electrical components 5, 6, 7, and 8 are insulated from each other and from adjacent conductor elements by the insulation material of the panel.

After the components have been mounted upon panel 4, the surface which includes the conductor elements may be solder dipped to provide a solid electrical connection between the terminals of the circuit elements and the conductor elements.

Electrical circuit units of this type have the advantage of constant conductor width, an important factor not usually realized with the conventional etching process; more compact design; and the elimination of troublesome eyelets for "through-panel" connections. Most important of all, however, is the almost unlimited flexibility which may be realized. Changes in circuitry may be made merely through the change in perforations and use of alternative conductive elements, as has been described hereinbefore.

While a preferred embodiment of the present invention has been shown and described, it will be obvious to those skilled in the art that various modifications and substitutions may be made without departing from the spirit of the invention, which is to be limited only within the scope of the appended claims.

What is claimed is:

1. An electrical circuit unit of the type having an integral circuit component inter-connecting conductive pattern and supporting panel comprising a panel of dielectric material having first and second opposite plane surfaces bounded by four edge surfaces and a plurality of spaced parallel grooves upon one surface thereof each extending across the said surface from one of said bounding edge surfaces to the opposite of said bounding edge surfaces, a conductor element secured to the bottom surface of each one of said grooves, and a conductor element secured to each surface between adjacent ones of said grooves whereby successive conductor elements are separated by a distance equal to the depth of said grooves.

2. An electrical circuit unit of the type having an integral circuit component inter-connecting conductive pattern and supporting panel comprising a panel of dielectric material having first and second opposite plane surfaces bounded by four edge surfaces and a plurality of spaced parallel grooves upon one surface thereof each extending across the said surface from one of said bounding edge surfaces to the opposite of said bounding edge surfaces, a conductor element secured to the bottom surface of each one of said grooves, and a conductor element secured to each surface between adjacent ones of said grooves whereby two planes of conductor elements separated by a distance equal to the depth of said grooves are provided.

3. An electrical circuit unit of the type having an integral circuit component inter-connecting conductive pattern and supporting panel comprising a panel of dielectric material having first and second opposite plane surfaces bounded by four edge surfaces and a plurality of spaced parallel grooves upon one surface thereof each extending across the said surface from one of said bounding edge surfaces to the opposite of said bounding edge surfaces, a conductor element substantially the width of said grooves secured to the bottom surface of each one of said grooves, and a conductor element of a width substantially equal to the space between said grooves secured to each surface between adjacent ones of said grooves whereby successive conductor elements are separated by a distance equal to the depth of said grooves.

4. An electrical circuit unit of the type having an integral circuit component inter-connecting conductive pattern and supporting panel comprising a panel of dielectric material having first and second opposite plane surfaces bounded by four edge surfaces and a plurality of spaced parallel grooves upon one surface thereof each extending across the said surface from one of said bounding edge surfaces to the opposite of said bounding edge surfaces, a conductor element secured to the bottom surface of each one of said grooves, a conductor element secured to each surface between adjacent ones of said grooves, and a plurality of electrical circuit components mounted upon said panel in such a manner that various combinations of said conductor elements provide electrical inter-connections therebetween in accordance with circuit requirements.

5. An electrical circuit unit of the type having an integral circuit component inter-connecting conductive pattern and supporting panel comprising a panel of dielectric material having first and second opposite plane surfaces bounded by four edge surfaces and a plurality of spaced parallel grooves upon one surface thereof each extending across the said surface from one of said bounding edge surfaces to the opposite of said bounding edge surfaces, a conductor element secured to the bottom surface of each one of said grooves, a conductor element secured to each surface between adjacent ones of said grooves, and a plurality of electrical circuit components having the terminals thereof extending through perforations in said panel whereby various combinations of said conductor elements provide electrical inter-connections therebetween in accordance with circuit requirements.

6. An electrical circuit unit of the type having an integral circuit component inter-connecting conductive pattern and supporting panel comprising a panel of dielectric material having first and second opposite plane surfaces bounded by four edge surfaces and a plurality of spaced parallel grooves upon one surface thereof each extending across the said surface from one of said bounding edge surfaces to the opposite of said bounding edge surfaces, a conductor element substantially the width of said grooves secured to the bottom surface of each one of said grooves, a conductor element of a width substantially equal to the space between said grooves secured to each surface between adjacent ones of said grooves, and a plurality of electrical circuit components mounted upon said panel in such a manner that various combinations of said conductor elements provide electrical inter-connections therebetween in accordance with circuit requirements.

7. An electrical circuit unit of the type having an integral circuit component inter-connecting conductive pattern and supporting panel comprising a panel of dielectric material having first and second opposite plane surfaces bounded by four edge surfaces and a plurality of spaced parallel grooves upon one surface thereof each extending across the said surface from one of said bounding edge surfaces to the opposite of said bounding edge surfaces, a conductor element substantially the width of said grooves secured to the bottom surfaces of each one of said grooves, a conductor element of a width substantially equal to the space between said grooves secured to each surface between adjacent ones of said grooves, and a plurality of electrical circuit components having the terminals thereof extending through perforations in said panel whereby various combinations of said conductor elements provide electrical inter-connections therebetween in accordance with circuit requirements.

8. An electrical circuit unit of the type having an integral circuit component inter-connecting conductive pattern and supporting panel comprising a panel of dielectric material having first and second opposite plane surfaces bounded by four edge surfaces and a plurality of spaced parallel grooves upon one surface thereof each extending across the said surface from one of said bounding edge surfaces to the opposite of said bounding edge surfaces, a conductor element secured to the bottom surface of each one of said grooves, a conductor element secured to each surface between adjacent ones of said grooves whereby two planes of conductor elements separated by a distance equal to the depth of said grooves are provided, and a plurality of electrical circuit components having the terminals thereof extending through perforations in said panel whereby various combinations of said conductor elements provide electrical inter-connections therebetween in accordance with circuit requirements.

References Cited in the file of this patent

UNITED STATES PATENTS

| | | |
|---|---|---|
| 2,777,193 | Albright et al. | Jan. 15, 1957 |
| 2,988,839 | Greenman et al. | June 20, 1961 |
| 3,076,862 | Luedicke et al. | Feb. 5, 1963 |

UNITED STATES PATENT OFFICE

CERTIFICATE OF CORRECTION

Patent No. 3,149,266 September 15, 1964

Alvin H. Lipton

It is hereby certified that error appears in the above numbered patent requiring correction and that the said Letters Patent should read as corrected below.

Column 1, line 50, before "surface" insert -- thereof has a conductor element secured to the bottom --; line 58, for "isometiric" read -- isometric --; line 61, for "locking" read -- looking --; column 2, line 36, for "one" read -- no --.

Signed and sealed this 12th day of January 1965.

(SEAL)
Attest:

ERNEST W. SWIDER
Attesting Officer

EDWARD J. BRENNER
Commissioner of Patents